United States Patent
Seo et al.

(10) Patent No.: US 7,090,760 B2
(45) Date of Patent: Aug. 15, 2006

(54) METHOD OF REDUCING SPENT OXIDE NUCLEAR FUEL INTO NUCLEAR-FUEL METAL USING LICL-LI₂O SALT, CATHODE ELECTRODE ASSEMBLY USED IN THE METHOD, AND REDUCTION DEVICE INCLUDING THE ASSEMBLY

(75) Inventors: Chung Seok Seo, Daejeon (KR); Jin Mok Hur, Daejeon (KR); In Kyu Choi, Daejeon (KR); Seong Won Park, Daejeon (KR); Hyun Soo Park, Daejeon (KR)

(73) Assignees: Korea Atomic Energy Research Institute, Daejeon (KR); Korea Hydro & Nuclear Power, Co. Ltd., Seoul (KR)

( * ) Notice: Subject to any disclaimer, the term of this patent is extended or adjusted under 35 U.S.C. 154(b) by 353 days.

(21) Appl. No.: 10/618,058

(22) Filed: Jul. 11, 2003

(65) Prior Publication Data
US 2004/0007466 A1 Jan. 15, 2004

(30) Foreign Application Priority Data
Mar. 28, 2003 (KR) .................. 10-2003-0019388

(51) Int. Cl.
*C25C 3/34* (2006.01)
*C25C 3/00* (2006.01)
*C25C 7/00* (2006.01)

(52) U.S. Cl. .................. 205/47; 205/367; 204/280; 204/288; 204/289; 204/245

(58) Field of Classification Search .................. None
See application file for complete search history.

(56) References Cited

U.S. PATENT DOCUMENTS

| 3,215,609 | A | * | 11/1965 | Chapdelaine | 205/81 |
| 3,540,994 | A | * | 11/1970 | Napier | 204/673 |
| 4,699,704 | A | * | 10/1987 | Ishizuka | 204/247 |
| 6,299,748 | B1 | * | 10/2001 | Kondo et al. | 205/47 |
| 6,540,902 | B1 | * | 4/2003 | Redey et al. | 205/354 |
| 6,911,134 | B1 | * | 6/2005 | Dees et al. | 205/43 |

OTHER PUBLICATIONS

Herrmann et al, "Electrolytic Reduction of Spent Oxide Fuel", Sep. 2002.*

* cited by examiner

*Primary Examiner*—Harry D. Wilkins, III
(74) *Attorney, Agent, or Firm*—Bachman & LaPointe, P.C.

(57) ABSTRACT

Disclosed are a method of reducing spent oxides nuclear fuel to nuclear-fuel metal, in which metal oxides are reduced to metals using an electrochemical reduction device with LiCl—Li₂O salt as an electrolyte, a cathode electrode assembly used in the method, and a reduction device including the cathode electrode assembly. The method is advantageous in that the process of reducing the spent oxide nuclear fuel to the nuclear-fuel metal and another process of recovering Li are united to simplify the whole processes, direct use of high oxidative Li metals is excluded to secure safety, and conversion efficiency of the spent oxide nuclear fuel is 99% or more.

10 Claims, 5 Drawing Sheets

METHOD OF REDUCING SPENT OXIDE NUCLEAR FUEL INTO NUCLEAR-FUEL METAL USING LICL-LI$_2$O SALT, CATHODE ELECTRODE ASSEMBLY USED IN THE METHOD, AND REDUCTION DEVICE INCLUDING THE ASSEMBLY

BACKGROUND OF THE INVENTION

1. Field of the Invention

The present invention pertains to a method of reducing metal oxides to metals using an electrochemical reduction device in which LiCl-based salt is employed as an electrolyte. In particular, it can be used to reduce spent oxide nuclear fuel to nuclear-fuel metal utilizing the reduction device with LiCl—Li$_2$O salt.

2. Description of the Prior Art

As well known to those who have experience in the art, an electrochemical reduction device consists, in general, of a cathode, an anode, and an electrolyte. Chemical changes such as reduction and decomposition of compounds are occurred in these kinds of apparatuses by difference in electric potentials. Many instruments have been devised especially in recovering highly purified metals from metal oxides.

Argonne National Laboratory (ANL) in the USA has developed a method of recovering nuclear-fuel metal from spent oxide nuclear fuel using an electrochemical reduction device in which the spent oxide nuclear fuel is reduced to the nuclear-fuel metal in molten LiCl-based salt at high temperature. Actinide elements in the spent oxide fuel are recycled according to the IFR (integral fast reactor) nuclear fuel cycle process. Researchers of the ANL have developed a fuel recycle technology to reuse the spent oxide nuclear fuel by reducing into metal in the molten LiCl-based salt at high temperature and found that a LiCl—Li salt system is sufficiently competitive in recovering the spent oxide fuel to the corresponding metallic form considering the reaction temperature and corrosiveness of materials.

The conversion efficiency of the reduction reaction increases as Li metal reacts with the spent oxide nuclear fuel into the nuclear-fuel metal and Li$_2$O which is dissolved in molten LiCl-based salt then recycled to the reactor by Li electrowinning in LiCl—Li$_2$O salt.

On the other hand, the method has the following disadvantages:

First, when the concentration of Li$_2$O produced during the reduction of the spent oxide nuclear fuel increases, the conversion efficiency of some elements in the spent oxide nuclear fuel such as uranium and plutonium oxides decreases and undesirable side products such as complex oxides and chlorides are produced since Li$_2$O with rare-earth elements. Accordingly, it takes a relatively long time of 80 hours to convert the spent oxide nuclear fuel effectively to the nuclear-fuel metal and the conversion efficiency of the spent oxide nuclear fuel reaches an unsatisfactory value while maintaining the concentration of Li$_2$O below 3.2 wt %.

Second, both the inside and the outside of the reactor must be kept under an inert atmosphere since the Li metal is vulnerable even to small amount of oxygen and moisture.

Third, there is difficulty to form the LiCl—Li salt system because of the low solubility of the Li metal to the molten LiCl and the density difference between molten LiCl and Li metal. Therefore, a mixture of the LiCl-based liquid salt and the Li metal must be agitated mechanically for the uniform dispersion of the floating Li and the consequent enhancement of the reaction rate as disclosed in Japanese Pat. No. 2000-292593.

Japanese Pat. No. 2000-131489 describes the simultaneous performance of the first process of reducing the spent oxide nuclear fuel to the nuclear-fuel metal and the second process of recycling the Li metal into the first stage. However, the patent discloses that the first and the second process are independently conducted when the first process is combined with the second process. Therefore, the patent fails to clear up the listed disadvantages, and is unfavorable since it is difficult to connect the first and the second process for subsequent processes because of complexity of whole processes including the above processes. Furthermore, the patent is not competitive in terms of operational stability.

Accordingly, there remains a need to develop a method capable of overcoming the above disadvantages.

SUMMARY OF THE INVENTION

The present invention has been made keeping in mind the above problems occurring in the prior art, and an object of the present invention is to provide an effective and desirable method of combining the first process of reducing the spent oxide nuclear fuel to the nuclear-fuel metal using LiCl—Li$_2$O salt and the second process of recovering and recycling the used Li metal into the first process.

It is another object of the present invention to develop a cathode electrode assembly used in the method, and a reduction device including the assembly.

The present invention accomplishes the noted objects by providing a unique method of reducing the spent oxide nuclear fuel to the nuclear-fuel metal and developing an electrochemical reduction device used for the method with LiCl-based salt as an electrolyte. LiCl—Li$_2$O salt is adopted as the LiCl-based salt herein.

Further, a cathode electrode assembly is also devised in the present invention. The assembly is made for reducing the spent oxide nuclear fuel and fabricated in appropriate shape for pouring reactants and gathering products.

A new type of reduction device is invented along with the newly developed electrode assembly. The spent oxide nuclear fuel is reduced to the nuclear-fuel metal in the device with a plurality of anodes located on the same distance from the center of the cathode electrode assembly while being spaced apart from each other at predetermined regular intervals. A reference electrode which is needed to measure the potential difference of the reduction cell is located on the hypothetical circle line formed by the anodes and positioned at the middle of two adjacent anodes. An electrolyte injection part for letting powder LiCl-based salt into the reduction reactor is positioned on the top of the device and a reactor receiving the cathode electrode assembly, the anodes, the reference electrode, and the LiCl—Li$_2$O salt is placed at the bottom of the device.

BRIEF DESCRIPTION OF THE DRAWING

The above and other objects, features and advantages of the present invention will be more clearly understood with the following detailed description on the accompanying drawings.

DETAILED DESCRIPTION OF THE INVENTION

Figure 1:
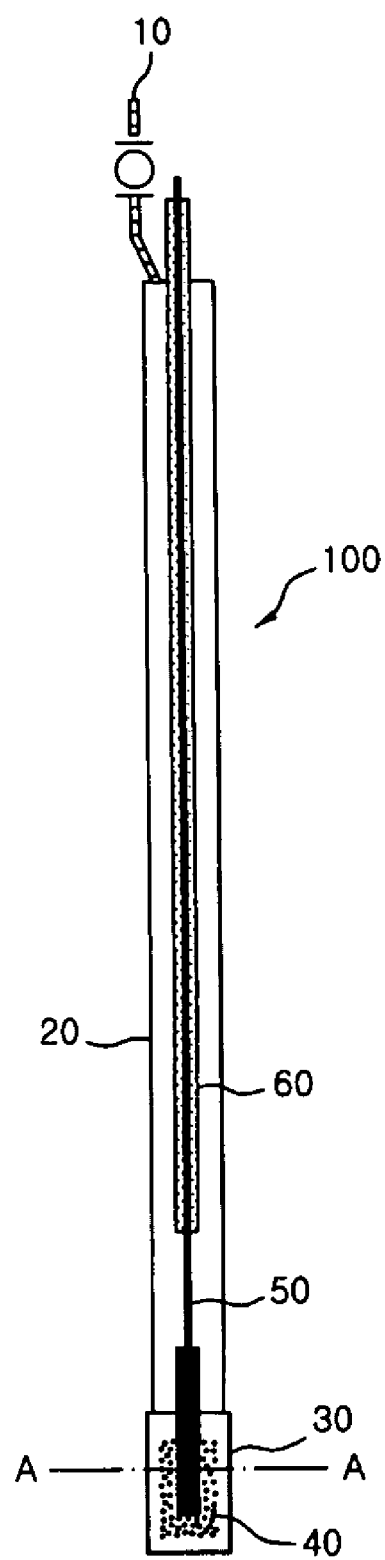
FIG. 1 schematically illustrates a cathode electrode assembly for reducing the spent oxide nuclear fuel to the nuclear-fuel metal according to the present invention.

In this invention, a method of reducing the spent oxide nuclear fuel into the nuclear-fuel metal is provided. An electrochemical reduction device, one of the major parts of the present invention, is designed and made to carry out the method using LiCl—Li$_2$O salt as an electrolyte. The device is expected to be applied to related processes of those who skilled in the art with minor modification retaining the originality of this invention.

The reduction of uranium oxide to uranium metal occurs in molten LiCl—Li$_2$O at high temperature and the reaction mechanism is shown in the following reaction equation 1.

Reaction equation 1

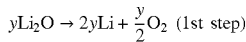

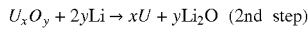

The reaction mechanism of various nuclear-fuel metals could be obtained simply by substituting the uranium oxide in the reaction equation 1 with corresponding oxides.

From the reaction equation 1, it can be seen that Li$_2$O contained in the LiCl—Li$_2$O molten salt is electrolyzed into the Li metal and oxygen gas at predetermined temperature ranging from 600 to 700° C., preferably 650° C., and at the external potential of −2.592 V or higher (first step), then the Li metal produced in the first step reacts with the uranium oxide to produce Li$_2$O and the uranium metal (second step).

As described above, the nuclear-fuel metal is desirably recovered from the spent oxide nuclear fuel, and the same amount of Li$_2$O is regenerated at the second step as much consumed at the first step and participates in the first step to complete the closed recycle in the molten LiCl-based salt.

Another reaction mechanism of consideration is shown in the following reaction equation 2, in which uranium oxide is reduced to uranium metal in the molten LiCl—Li$_2$O salt.

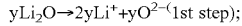

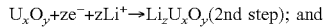

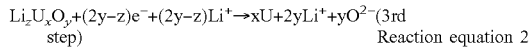

Reaction equation 2

At first, Li$_2$O is electrolyzed in the molten LiCl—Li$_2$O to Li and oxygen ions at predetermined temperature, higher than the melting point of pure LiCl, within the range of 600 to 700° C., preferably 650° C., and at less than −2.592 V of the applied potential (first step). From the reaction equation 2, it can be seen that the chemical form of oxygen at the first step in the reaction equation 2 is different from that at the first step in the first mechanism. Then, the Li ions produced in the first step react with uranium oxides to produce lithium uranates (second step), and the lithium uranates are electrolyzed under condition of excess Li metal ions to produce uranium metals and oxygen ions (third step). The oxygen ions produced in the third step are converted into oxygen gas, not given in the reaction equation 2, at anodes of the reduction device and then vented.

Further, the present invention provides a cathode electrode assembly for reducing the spent oxide nuclear fuel to the nuclear-fuel metal. The assembly consists of a spent oxide nuclear fuel injection part, an outer pipe connected to the spent fuel injection part, and a magnesia filter. The spent fuel injection part through which the irradiated oxide nuclear fuel is charged in the reduction device is an upward tube branch adjoined with the outer pipe on the upper part of the assembly. A porous cylindrical magnesia filter is connected to the lower part of the outer pipe and pinned on the pipe. The main frame of the cathode electrode assembly is the outer pipe the upper part of which is connected to the spent oxide fuel injection tube and the lower par of which holds the magnesia filter. Placed at the center of the outer pipe, a solid electrode is inserted into the outer pipe and extends to the inside of the magnesia filter. Radial blades are attached to the lower part of the solid cathode and placed in the magnesia filter. An alumina tube surrounds the solid electrode except the radial blades to electrically insulate the solid cathode with the outer pipe.

Figure 2:
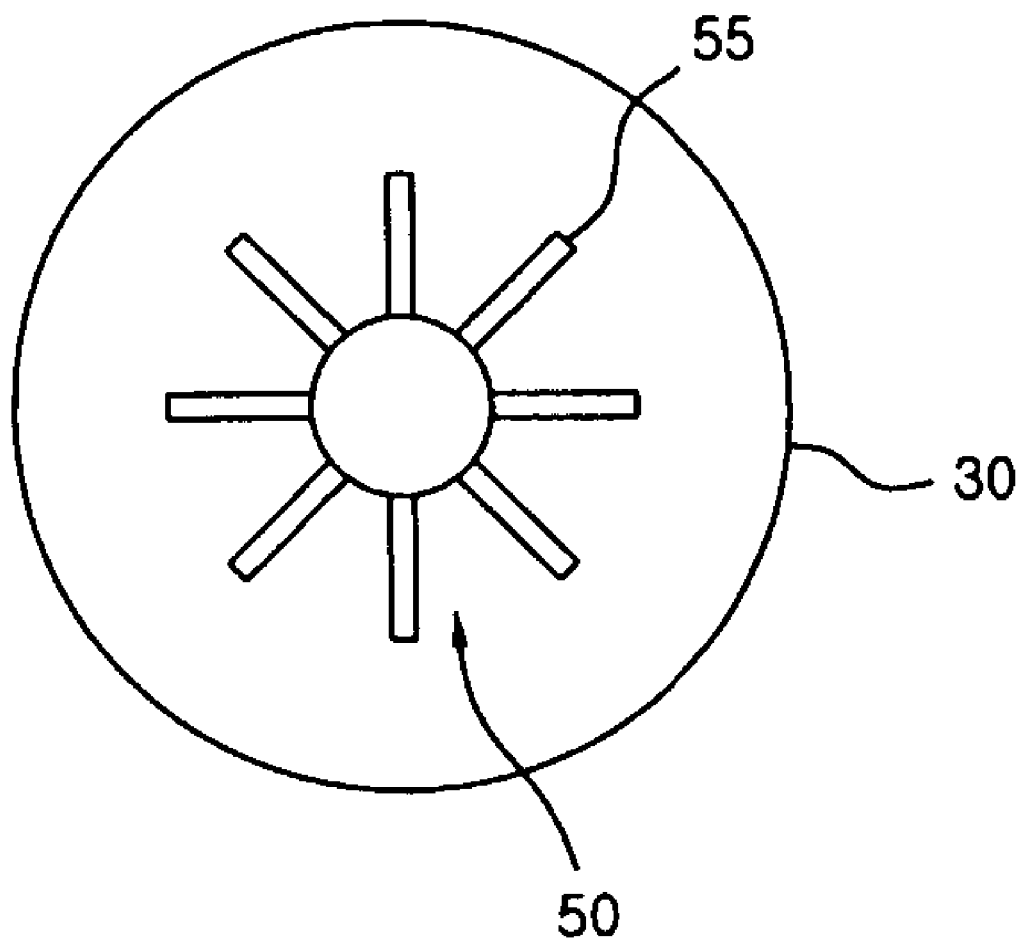
FIG. 2 is a sectional view taken along the line A—A of FIG. 1.

FIG. 1 schematically illustrates the cathode electrode assembly for reducing the spent oxide nuclear fuel to the nuclear-fuel metal and FIG. 2 is a cross-sectional view taken along the line A—A of FIG. 1.

As shown in FIG. 1, the cathode electrode assembly 100 of the present invention is provided with a spent oxide nuclear fuel injection part 10 at the upper part. The spent oxide nuclear fuel injection part 10 is connected to the upper part of the outer pipe 20, and the outer pipe 20 is connected to a porous magnesia filter 30 at the lower part thereof. Accordingly, the spent oxide nuclear fuel 40 injected through the spent oxide nuclear fuel injection part 10 is filled in the magnesia filter 30.

The spent oxide nuclear fuel 40 has an average particle size of about 20 μm, and is uniformly filled in the magnesia filter 30 in such a way that the density of the spent oxide nuclear fuel 40 filled in the magnesia filter 30 is 2.8 to 2.9 g/Cm$^3$.

The outer pipe 20 functions to keep the fine particle of the spent oxide nuclear fuel 40 in the magnesia filter 30.

Magnesium oxide is preferred as the component of the magnesia filter 30 and the filter has pores of an average diameter of 5 to 10 μm. The magnesia filter plays an important role in recycling the Li$_2$O or Li ions since the Li and oxygen ions freely penetrate the filter through the pores and contact with the spent oxide while the oxide is confined in the filter.

Acting as an electrode connection part, a solid electrode 50 of stainless steel is extended from the top of the outer pipe 20 to the inside of the magnesia filter 30 and contacts with the spent oxide nuclear fuel 40 packed in the magnesia filter 30. The material constituting the solid electrode 50 is not limited to stainless steel.

As presented in FIG. 2, the solid electrode 50 has radial blades 55 positioned at the lower part thereof so as to improve its current density.

An alumina tube 60 surrounds the solid electrode 50 except the radial blades 55 in order to prevent the solid electrode 50 from electrically connecting to the reactor.

The present invention provides a reduction device for reducing the spent oxide nuclear fuel to the nuclear-fuel metal as well, utilizing the cathode electrode assembly. A plurality of anodes is located on the same distance from the cathode electrode assembly while being spaced apart from each other at predetermined regular intervals. As well, a reference electrode is located on the same circle as the anodes and positioned at the middle of two adjacent anodes. The reduction device also includes a tube-type electrolyte injection part at the top for filling electrolyte, molten LiCl—$Li_2O$ salt, into the reduction device. The cathode electrode assembly, the anodes, and the reference electrode are placed through the top of the device as well as the injection part and the LiCl—$Li_2O$ salt is filled to the bottom of the inside.

Figure 3:
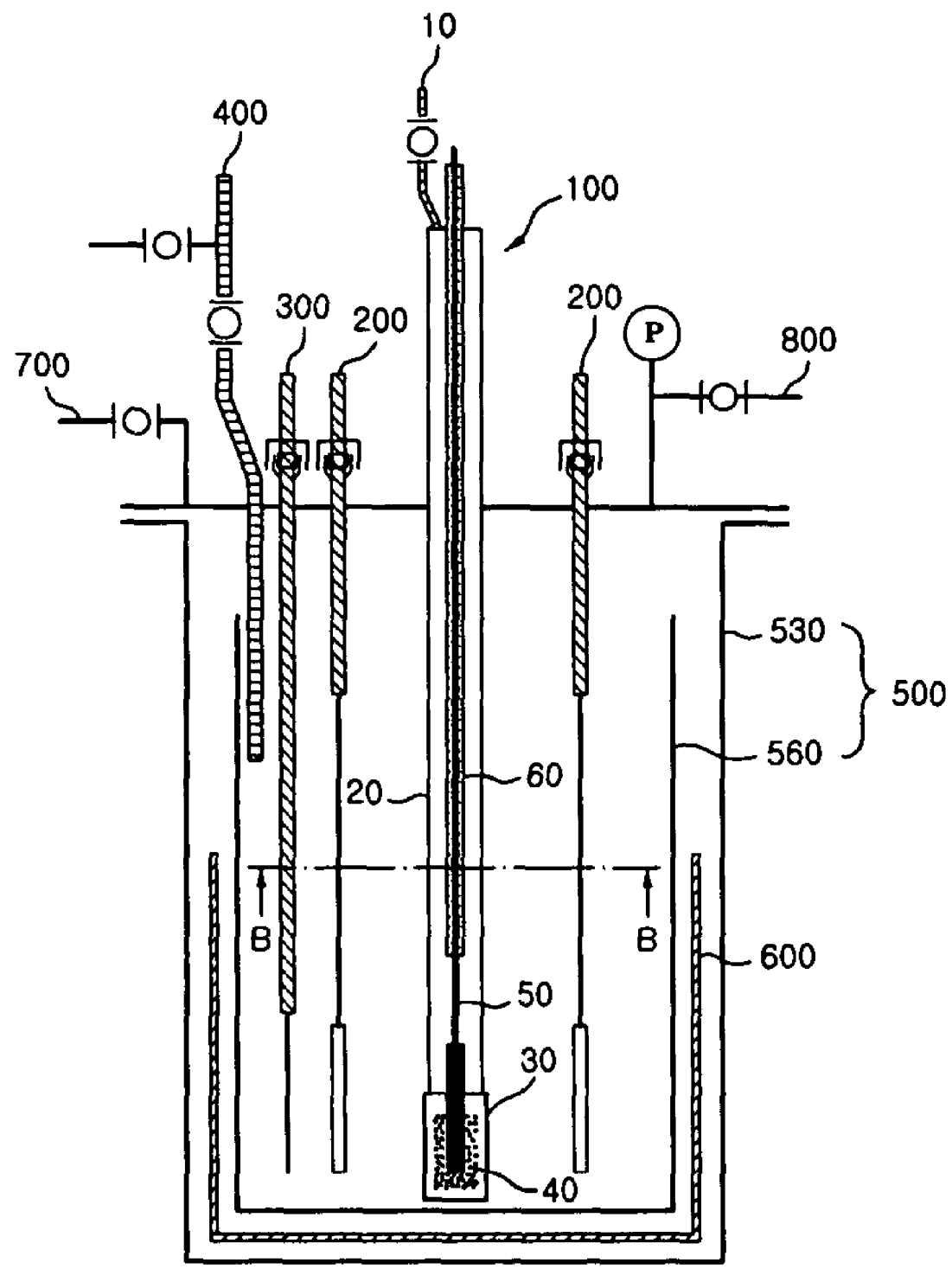
FIG. 3 is a schematic illustration of the reduction device for reducing the spent fuel.
Figure 4:
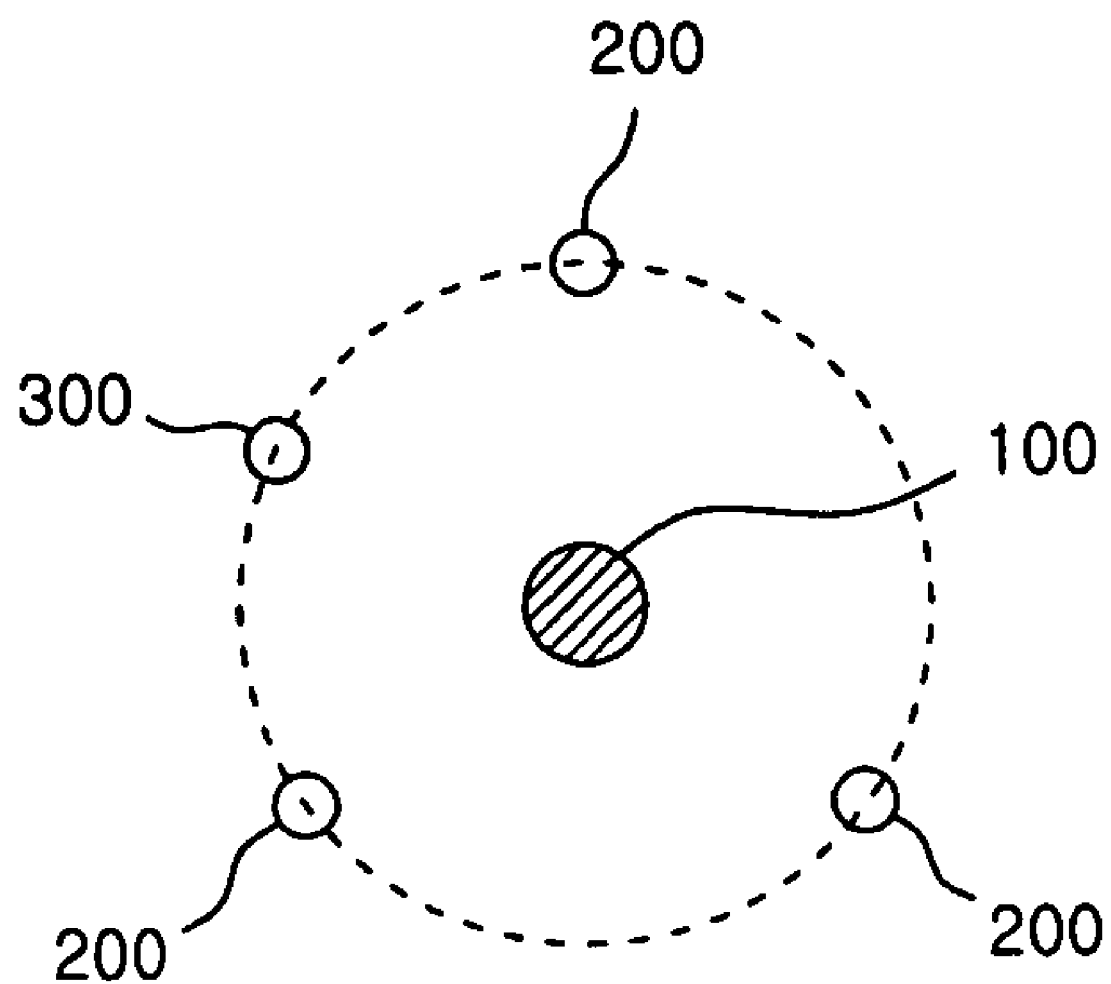
FIG. 4 is a sectional view taken in the direction of the arrows along the line B—B of FIG. 3.

FIG. 3 schematically illustrates the reduction device of the present invention, and FIG. 4 is a cross-sectional view taken in the direction of the arrows along the line B—B of FIG. 3.

Referred in FIGS. 3 and 4, the reduction device of the present invention includes the cathode electrode assembly 100 located at the center of the reduction device, a plurality of anodes 200 located at the vertexes of the equilateral triangle on a circle around the cathode electrode assembly 100, and a reference electrode 300 placed on the same circle as the anodes 200.

The cathode electrode assembly 100 as described above is a removable installment from the reduction device, thereby the filling of the spent oxide nuclear fuel powder into the magnesia filter 30 and the collecting of the reduced metal are easily conducted. In detail, after the completion of the reduction of the spent oxide nuclear fuel to the nuclear-fuel metal, the cathode electrode assembly 100 is readily separated from the LiCl—$Li_2O$ molten salt system, and the reduction device is then cooled under strictly inert atmosphere (concentrations of oxygen and moisture are kept less than 10 ppm) to prevent the reduced nuclear-fuel metal powder from oxidizing and to recover metal powder containing minimum residual of molten salt.

Anodes made of precious metals such as platinum and of ceramics such as magnetite are applicable to the present reduction device. It is preferable to use the ceramic electrode consisting of ceramic oxides such as $Fe_3O_4$, SnO, and Nio useful in a high temperature anode circumstance in order to improve the current density of the solid electrode. Additionally, the number of anodes suitable for the reduction device is three located on one circle at predetermined regular intervals.

One illustrative, but non-limiting example of the material of the reference electrode 300 is platinum, and modifications of the reference electrode 300 would be available for those skilled in the art without departing from the spirit of the present invention. The location of the reference electrode 300 is preferable at the middle of two adjacent anodes 200 as shown in FIG. 4.

The electrolyte injection part 400 is a conduit set on the top of the reduction device, through which LiCl and $Li_2O$ are injected and filled at the bottom of the device forming the LiCl—$Li_2O$ salt mixture. At this time, the concentration of $Li_2O$ in the LiCl—$Li_2O$ salt is about 3 wt %.

Meanwhile, the reactor 500 receives the cathode electrode assembly 100, the anodes 200, the reference electrode 300, and the LiCl—$Li_2O$ salt. The reactor has a dual structure comprising an outer reaction vessel 530 and an inner reaction vessel 560. Additionally, an alumina crucible 600 might be inserted between the outer and inner reaction vessel 530 and 560. The alumina crucible 600 functions to intercept electric noise generated from an outer furnace.

Moreover, an inert gas inlet tube 700 and a vent 800 are set on the reactor 500 to feed and vent inert gas, and function to control inert gas atmosphere in the inner reaction vessel 560 and to vent oxygen gas generated during the electrolysis of $Li_2O$ and the conversion of the spent oxide nuclear fuel to the nuclear-fuel metal.

Hereinafter, there will be given a description of a method of reducing the spent oxide nuclear fuel to the nuclear-fuel metal using the reduction device of the present invention.

The inside of the reactor 500 is filled with inert gas, LiCl is injected through the electrolyte injection part 400 into the reactor 500, and heated to 300 then up to 650□. At this time, argon gas flows from the inert gas inlet tube 700 to the vent 800, thereby completely removing moisture and hydrates adsorbed in the LiCl.

Considering the melting point of LiCl (613° C.), the inside of the reactor 500 is heated to the temperature of 600 to 700° C., and preferably 650° C. to melt the LiCl completely. Predetermined amount of $Li_2O$ is then added to the molten LiCl to form a LiCl—$Li_2O$ molten salt system containing 3 wt % of $Li_2O$.

While the LiCl—$Li_2O$ salt is maintained at the temperature of 650° C., the predetermined voltage (P) is applied to the molten LiCl—$Li_2O$ salt system. The reaction mechanism of the LiCl—$Li_2O$ salt and the spent nuclear oxide fuel depends on the voltage.

In detail, when the potential is -2.592 V or higher, $Li_2O$ is electrolyzed to produce Li metal at the cathode electrode assembly 100, then the Li metal is electrically deposited on the cathode electrode assembly 100 and simultaneously reacts with the spent oxide nuclear fuel to produce the nuclear-fuel metal and the $Li_2O$, and oxygen ions generated during the electrolysis of $Li_2O$ are converted to oxygen gas at the anodes 200 and vented as shown in the reaction equation 1.

The concentration change of $Li_2O$ is observed to decrease in proportion to current at the early stage of the electrolytic reaction while the decreasing rate slows down than the expected value by the theoretical prediction after 15 hours, confirming that $Li_2O$ is recycled to the molten LiCl salt in the closed system. Hence, based on the reaction mechanism of the reaction equation 1, it can be seen that the final concentration of $Li_2O$ must be about 0.5 wt % or higher in order to prevent the potential of the anodes from increasing. At this time, the conversion efficiency of the reduction reaction is greater than 99.9%.

On the other hand, when the applied potential to the cell is less than -2.592 V, $Li_2O$ is electrolyzed to produce Li ions at the cathode electrode assembly 100 and the Li ions react with uranium oxide to lithium uranate. Then, the produced lithium uranate is electrolyzed to metal uranium. Furthermore, oxygen ions generated during the electrolysis of $Li_2O$ are converted to oxygen gas at the anodes 200 and vented out of the device.

Figure 5:
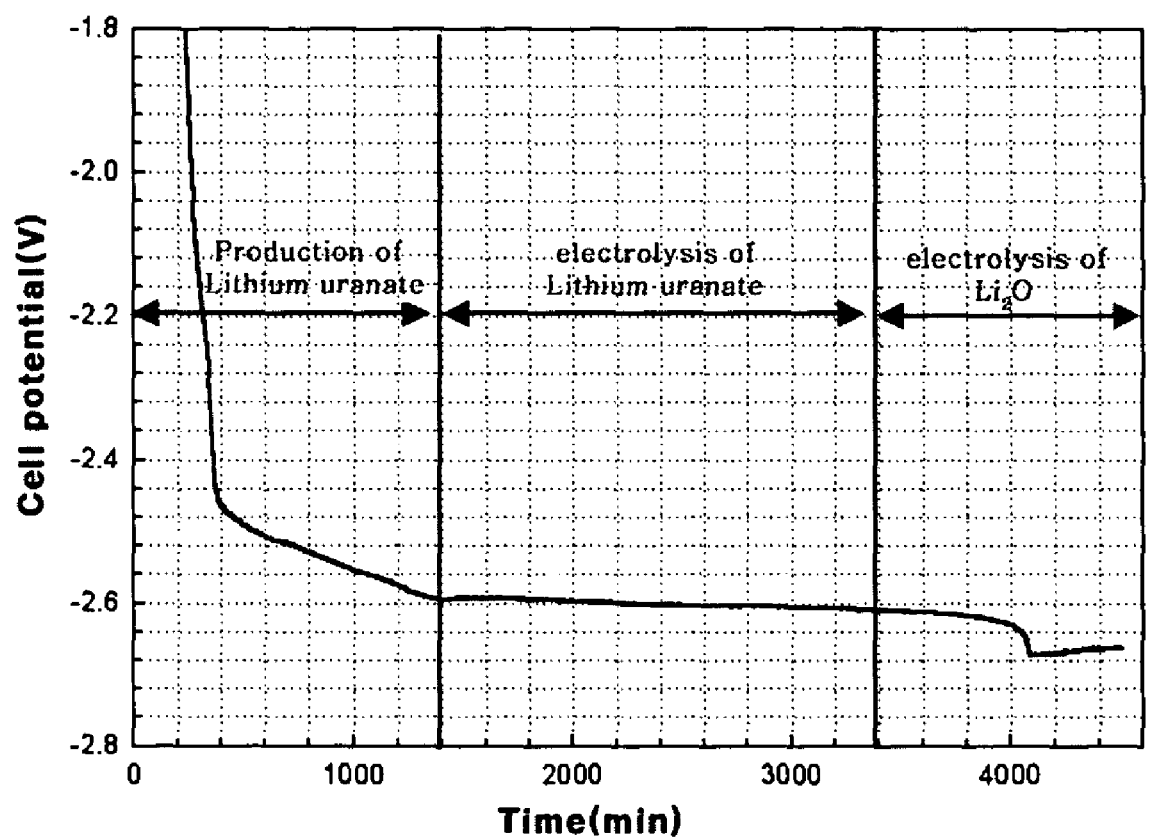
FIG. 5 is a graph representing the cell potential change during the reduction when potential of less than −2.592 V is applied to the device of the present invention.

Turning now to FIG. 5, a graph illustrating the potential change with time is presented. The potential of the cell in FIG. 5 is recorded when less than -2.592 V of the applied potential was given to the cell in which the concentration of $Li_2O$ is decreases in proportion to the current during the production of lithium uranate according to the reaction equation 2. In this regard, the concentration of $Li_2O$ is maintained during the electrolysis of lithium uranate, and the conversion efficiency of reducing the spent oxide fuel into the nuclear-fuel metal is greater than 99.0%.

At the termination stage of the reduction reaction, the cathode electrode assembly 100 is lifted from the molten LiCl—$Li_2O$ salt and kept suspending in the reduction device filled with inert atmosphere until the target metal powder is sufficiently cooled in the reduction device for enough time and then pulled out so as not to be re-oxidized. Subsequently, the obtaining metal powder might be melted at 1300□and then cooled to form ingot.

As described above, the method of reducing the spent oxide nuclear fuel to the nuclear-fuel metal according to the present invention has the advantage in that the process of reducing the spent oxide nuclear fuel to the nuclear-fuel metal and another process of recovering Li are united to simplify the whole processes, the direct use of highly oxidative Li metals is excluded to secure safety, and the conversion efficiency of the spent oxide nuclear fuel is 99% or greater.

There are other advantages that the solid electrode has radial blades to improve its current density, so it is not necessary to conduct the forcible dispersion and agitation unlike conventional technologies and that filling the spent oxide nuclear fuel powder in the device and recovering the reduced oxide nuclear fuel powder are easy to complete since the cathode is readily detached from the reduction device.

The present invention has been described in an illustrative manner, and it is to be understood that the terminology used is intended to be in the nature of description rather than of limitation. Many modifications and variations of the present invention are possible in the light of the above teachings. Therefore, it is to be understood that within the scope of the appended claims, the invention may be practiced otherwise than as specifically described.

What is claimed is:

1. A method of reducing spent oxide nuclear fuel to nuclear-fuel metal, comprising reducing metal oxides to metals using an electrochemical reduction device with $LiCl$—$Li_2O$ salt as an electrolyte, said electrochemical reduction device comprising:

a cathode electrode assembly comprising: a spent oxide nuclear fuel injection part; an outer pipe connected to the spent oxide nuclear fuel injection part at the upper part thereof; a porous magnesia filter connected to the lower part of the outer pipe; a solid electrode extended from the top of the outer pipe to the inside of the magnesia filter and having radial blades positioned at the lower part thereof; and an alumina tube surrounding the solid electrode except the radial blades positioned at the lower part of the solid electrode;

a plurality of anodes located on circle around the cathode electrode assembly while being spaced apart from each other at predetermined regular intervals;

a reference electrode located on the same circle as the anodes and positioned at the middle of two adjacent anodes;

an electrolyte injection part for injecting an electrolyte into the reduction device;

a $LiCl$—$Li_2O$ salt injected through the electrolyte injection part into the reduction device; and a reactor receiving the cathode electrode assembly, the anodes, the reference electrode, and the $LiCl$—$Li_2O$ molten salt.

2. The method as set forth in claim 1, wherein the method comprises:

$Li_2O$ contained in the $LiCl$—$Li_2O$ molten salt is electrolyzed into the Li metal and oxygen gas; and the Li metal reacts with the metal oxide to produce $Li_2O$ and the metal.

3. The method as set forth in claim 2, wherein the spent oxide nuclear fuel is reduced at the temperature of 600 to 700° C. and the potential of −2.592 V or higher.

4. The method as set forth in claim 1, wherein the method comprises:

$Li_2O$ contained in the $LiCl$—$Li_2O$ molten salt is electrolyzed into the Li and oxygen ions; the Li ion produced reacts with the metal oxide to produce metallic Lithium; and the metallic Lithium is electrolyzed under condition of excess Li metal ions to produce metal and oxygen ions.

5. The method as set forth in claim 4, wherein the spent oxide nuclear fuel is reduced at the temperature of 600 to 700° C. and the potential of −2.592 V or lower.

6. The method as set forth in claim 1, wherein the porous magnesia filter has pores with an average diameter of 5 to 10 μm.

7. The method as set forth in claim 1, wherein the porous magnesia filter is made of magnesium oxide.

8. The method as set forth in claim 1, wherein the cathode electrode assembly is installed in the reduction device.

9. The method as set forth in claim 1, wherein each of the anodes is ceramic oxide selected from the group consisting of $Fe_3O_4$, SnO, and NiO.

10. The method as set forth in claim 1, wherein the reactor has a dual structure comprising an inner reaction vessel and an outer reaction vessel, and an alumina crucible is inserted between the inner reaction vessel and outer reaction vessel.

* * * * *